US008848718B2

(12) United States Patent
Hussain et al.

(10) Patent No.: US 8,848,718 B2
(45) Date of Patent: **\*Sep. 30, 2014**

(54) HIERARCHICAL METERING IN A VIRTUAL ROUTER-BASED NETWORK SWITCH

(75) Inventors: Zahid Hussain, San Jose, CA (US);
Sachin Desai, Santa Clara, CA (US);
Naveed Alam, Cupertino, CA (US);
Joseph Cheng, Sunnyvale, CA (US);
Tim Millet, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1030 days.

This patent is subject to a terminal disclaimer.

(21) Appl. No.: 12/467,609

(22) Filed: May 18, 2009

(65) Prior Publication Data

US 2009/0225759 A1 Sep. 10, 2009

Related U.S. Application Data

(63) Continuation of application No. 11/621,102, filed on Jan. 8, 2007, now Pat. No. 7,668,087, which is a continuation of application No. 10/163,162, filed on Jun. 4, 2002, now Pat. No. 7,161,904.

(51) Int. Cl.
*H04L 12/28* (2006.01)
*H04L 12/66* (2006.01)
*G06F 15/173* (2006.01)

(52) U.S. Cl.
USPC ......... 370/395.1; 370/352; 370/392; 709/223

(58) Field of Classification Search
USPC ................ 370/230–236, 252–257, 392–412, 370/465–468; 709/220–229
See application file for complete search history.

(56) References Cited

U.S. PATENT DOCUMENTS

| | | |
|---|---|---|
| 4,667,287 A | 5/1987 | Allen et al. |
| 4,667,323 A | 5/1987 | Engdahl et al. |
| 4,726,018 A | 2/1988 | Bux et al. |
| 4,769,191 A | 9/1988 | Diana |
| 4,769,811 A | 9/1988 | Eckberg, Jr. et al. |
| 5,014,260 A | 5/1991 | Wicklund |
| 5,029,164 A | 7/1991 | Goldstein et al. |
| 5,040,171 A | 8/1991 | Osaki |
| 5,042,029 A | 8/1991 | Hayakawa |
| 5,119,372 A | 6/1992 | Verbeek |

(Continued)

OTHER PUBLICATIONS

Non-Final Rejection for U.S. Appl. No. 12/202,232 mailed Mar. 23, 2010.

(Continued)

*Primary Examiner* — Man Phan
(74) *Attorney, Agent, or Firm* — Morris & Kamlay LLP

(57) ABSTRACT

Methods and systems are provided for applying metering and rate-limiting in a virtual router environment and supporting a hierarchy of metering/rate-limiting contexts per packet flow. According to one embodiment, multiple first level metering options and multiple second level metering options associated with a hierarchy of metering levels are provided. A virtual routing engine receives packets associated with a first packet flow and packets associated with a second packet flow. The virtual routing engine performs a first type of metering of the first level metering options on the packets associated with the first packet flow using a first metering control block (MCB) and performs a second type of metering of the second level metering options on the packets associated with the first packet flow and the packets associated with the second packet flow using a second MCB.

19 Claims, 5 Drawing Sheets

(56) References Cited

U.S. PATENT DOCUMENTS

| | | |
|---|---|---|
| 5,130,978 A | 7/1992 | Mobasser |
| 5,243,596 A | 9/1993 | Port et al. |
| 5,253,247 A | 10/1993 | Hirose et al. |
| 5,258,979 A | 11/1993 | Oomuro et al. |
| 5,265,091 A | 11/1993 | van Landegem |
| 5,280,470 A | 1/1994 | Buhrke et al. |
| 5,289,462 A | 2/1994 | Ahmadi et al. |
| 5,313,454 A | 5/1994 | Bustini et al. |
| 5,317,563 A | 5/1994 | Oouchi et al. |
| 5,319,638 A | 6/1994 | Lin |
| 5,335,224 A | 8/1994 | Cole et al. |
| 5,347,511 A | 9/1994 | Gun |
| 5,359,593 A | 10/1994 | Derby et al. |
| 5,377,327 A | 12/1994 | Jain et al. |
| 5,394,408 A | 2/1995 | Nishihara et al. |
| 5,400,329 A | 3/1995 | Tokura et al. |
| 5,414,697 A | 5/1995 | Osaki |
| 5,420,859 A | 5/1995 | Takase et al. |
| 5,432,824 A | 7/1995 | Zheng et al. |
| 5,446,726 A | 8/1995 | Rostoker et al. |
| 5,457,687 A | 10/1995 | Newman |
| 5,479,404 A | 12/1995 | Francois et al. |
| 5,490,252 A | 2/1996 | Macera et al. |
| 5,519,689 A | 5/1996 | Kim |
| 5,541,920 A | 7/1996 | Angle et al. |
| 5,550,808 A | 8/1996 | Shimokoshi |
| 5,566,170 A | 10/1996 | Bakke et al. |
| 5,581,705 A | 12/1996 | Passint et al. |
| 5,592,470 A | 1/1997 | Rudrapatna et al. |
| 5,598,410 A | 1/1997 | Stone |
| 5,598,414 A | 1/1997 | Walser et al. |
| 5,633,866 A | 5/1997 | Callon |
| 5,640,389 A | 6/1997 | Masaki et al. |
| 5,666,353 A | 9/1997 | Klausmeier et al. |
| 5,671,216 A | 9/1997 | Subasingha et al. |
| 5,694,390 A | 12/1997 | Yamaato et al. |
| 5,734,825 A | 3/1998 | Lauck et al. |
| 5,745,778 A | 4/1998 | Alfieri |
| 5,764,641 A | 6/1998 | Lin |
| 5,784,358 A | 7/1998 | Smith et al. |
| 5,805,599 A | 9/1998 | Mishra et al. |
| 5,825,772 A | 10/1998 | Dobbins et al. |
| 5,828,654 A | 10/1998 | Takase et al. |
| 5,835,484 A | 11/1998 | Yamato et al. |
| 5,838,663 A | 11/1998 | Elwalid et al. |
| 5,838,681 A | 11/1998 | Bonomi et al. |
| 5,841,973 A | 11/1998 | Kessler et al. |
| 5,841,990 A | 11/1998 | Picazo et al. |
| 5,881,140 A | 3/1999 | Gerault et al. |
| 5,889,956 A | 3/1999 | Hauser et al. |
| 5,892,924 A | 4/1999 | Lyon et al. |
| 5,896,383 A | 4/1999 | Wakeland |
| 5,901,147 A | 5/1999 | Joffe |
| 5,917,805 A | 6/1999 | Manning et al. |
| 5,920,705 A | 7/1999 | Lyon et al. |
| 5,943,481 A | 8/1999 | Wakeland |
| 5,946,324 A | 8/1999 | Mishra et al. |
| 5,949,758 A | 9/1999 | Kober |
| 5,956,338 A | 9/1999 | Ghaibeh |
| 5,963,555 A | 10/1999 | Takase et al. |
| 5,964,847 A | 10/1999 | Booth et al. |
| 5,970,048 A | 10/1999 | Pajuvirta et al. |
| 5,974,033 A | 10/1999 | Kamiya et al. |
| 5,978,356 A | 11/1999 | Elwalid et al. |
| 5,983,261 A | 11/1999 | Riddle |
| 5,987,521 A | 11/1999 | Arrowood et al. |
| 6,014,382 A * | 1/2000 | Takihiro et al. ............... 370/399 |
| 6,032,190 A | 2/2000 | Bremer et al. |
| 6,032,193 A | 2/2000 | Sullivan |
| 6,046,979 A | 4/2000 | Bauman |
| 6,046,980 A | 4/2000 | Packer |
| 6,047,002 A | 4/2000 | Hartmann et al. |
| 6,047,330 A | 4/2000 | Stracke, Jr. |
| 6,069,895 A | 5/2000 | Ayandeh |
| 6,072,989 A | 6/2000 | Witters et al. |
| 6,098,110 A | 8/2000 | Witkowski et al. |
| 6,118,791 A | 9/2000 | Fichou et al. |
| 6,137,777 A | 10/2000 | Vaid et al. |
| 6,141,686 A | 10/2000 | Jackowski et al. |
| 6,167,445 A | 12/2000 | Gai et al. |
| 6,169,739 B1 | 1/2001 | Isoyama |
| 6,173,399 B1 | 1/2001 | Gilbrech |
| 6,175,568 B1 | 1/2001 | Awdeh |
| 6,175,867 B1 | 1/2001 | Taghadoss |
| 6,212,556 B1 | 4/2001 | Arunachalam |
| 6,220,768 B1 | 4/2001 | Barroux |
| 6,226,296 B1 | 5/2001 | Lindsey et al. |
| 6,226,788 B1 | 5/2001 | Schoening et al. |
| 6,243,580 B1 | 6/2001 | Garner |
| 6,249,519 B1 | 6/2001 | Rangachar |
| 6,256,295 B1 | 7/2001 | Callon |
| 6,260,072 B1 | 7/2001 | Rodriguez |
| 6,260,073 B1 | 7/2001 | Walker et al. |
| 6,266,695 B1 | 7/2001 | Huang et al. |
| 6,278,708 B1 | 8/2001 | Von Hammerstein et al. |
| 6,286,038 B1 | 9/2001 | Reichmeyer et al. |
| 6,295,297 B1 | 9/2001 | Lee |
| 6,298,130 B1 | 10/2001 | Galvin |
| 6,317,748 B1 | 11/2001 | Menzies et al. |
| 6,324,583 B1 | 11/2001 | Stevens |
| 6,330,602 B1 | 12/2001 | Law et al. |
| 6,338,092 B1 | 1/2002 | Chao et al. |
| 6,339,782 B1 | 1/2002 | Gerard et al. |
| 6,424,657 B1 | 7/2002 | Voit et al. |
| 6,434,619 B1 | 8/2002 | Lim et al. |
| 6,449,650 B1 * | 9/2002 | Westfall et al. ............... 709/228 |
| 6,453,406 B1 | 9/2002 | Sarnikowski et al. |
| 6,459,682 B1 | 10/2002 | Ellesson et al. |
| 6,463,061 B1 | 10/2002 | Rekhter et al. |
| 6,466,976 B1 | 10/2002 | Alles et al. |
| 6,477,670 B1 | 11/2002 | Ahmadvand |
| 6,496,935 B1 * | 12/2002 | Fink et al. ............... 726/13 |
| 6,526,056 B1 | 2/2003 | Rekhter et al. |
| 6,532,088 B1 | 3/2003 | Dantu et al. |
| 6,538,989 B1 | 3/2003 | Carter et al. |
| 6,542,466 B1 | 4/2003 | Pashtan et al. |
| 6,542,515 B1 | 4/2003 | Kumar et al. |
| 6,556,544 B1 | 4/2003 | Lee |
| 6,594,268 B1 | 7/2003 | Aukia et al. |
| 6,597,956 B1 | 7/2003 | Aziz et al. |
| 6,608,816 B1 | 8/2003 | Nichols |
| 6,611,498 B1 | 8/2003 | Baker et al. |
| 6,611,522 B1 | 8/2003 | Zheng et al. |
| 6,625,169 B1 | 9/2003 | Tofano |
| 6,625,650 B2 | 9/2003 | Stelliga |
| 6,631,519 B1 | 10/2003 | Nicholson et al. |
| 6,636,516 B1 | 10/2003 | Yamano |
| 6,639,897 B1 | 10/2003 | Shiomoto et al. |
| 6,647,008 B1 | 11/2003 | Galand et al. |
| 6,651,101 B1 | 11/2003 | Gai et al. |
| 6,658,013 B1 | 12/2003 | de Boer et al. |
| 6,668,282 B1 | 12/2003 | Booth et al. |
| 6,697,359 B1 | 2/2004 | George |
| 6,697,360 B1 | 2/2004 | Gai et al. |
| 6,738,371 B1 | 5/2004 | Ayres |
| 6,757,249 B1 | 6/2004 | Kejriwal et al. |
| 6,760,774 B1 | 7/2004 | Soumiya et al. |
| 6,763,236 B2 | 7/2004 | Siren |
| 6,775,267 B1 | 8/2004 | Kung et al. |
| 6,775,284 B1 | 8/2004 | Calvignac et al. |
| 6,785,691 B1 | 8/2004 | Hewett et al. |
| 6,792,470 B2 | 9/2004 | Hakenberg et al. |
| 6,807,181 B1 | 10/2004 | Weschler |
| 6,816,462 B1 | 11/2004 | Booth et al. |
| 6,856,676 B1 | 2/2005 | Pirot et al. |
| 6,868,082 B1 | 3/2005 | Allen et al. |
| 6,922,774 B1 | 7/2005 | Meushaw et al. |
| 6,938,097 B1 | 8/2005 | Vincent |
| 6,944,128 B2 | 9/2005 | Nichols |
| 6,944,168 B2 | 9/2005 | Paatela et al. |
| 6,954,429 B2 | 10/2005 | Horton |
| 6,959,194 B2 | 10/2005 | Brouwer et al. |
| 6,980,526 B2 | 12/2005 | Jang et al. |
| 6,985,438 B1 | 1/2006 | Tschudin |

(56) References Cited

U.S. PATENT DOCUMENTS

| | | | |
|---|---|---|---|
| 6,985,956 B2 | 1/2006 | Luke et al. | |
| 7,020,143 B2 | 3/2006 | Zdan | |
| 7,042,843 B2* | 5/2006 | Ni | 370/231 |
| 7,042,848 B2 | 5/2006 | Santiago | |
| 7,054,291 B2 | 5/2006 | Balazinski et al. | |
| 7,054,311 B2 | 5/2006 | Norman et al. | |
| 7,058,716 B1 | 6/2006 | Sundaresan et al. | |
| 7,068,656 B2 | 6/2006 | Sainomoto et al. | |
| 7,082,477 B1 | 7/2006 | Sadhasivam et al. | |
| 7,089,293 B2 | 8/2006 | Grosner et al. | |
| 7,096,383 B2 | 8/2006 | Talaugon et al. | |
| 7,096,495 B1 | 8/2006 | Warrier et al. | |
| 7,116,679 B1* | 10/2006 | Ghahremani | 370/463 |
| 7,127,049 B2 | 10/2006 | Godse et al. | |
| 7,159,035 B2 | 1/2007 | Garcia-Luna-Aceves et al. | |
| 7,161,904 B2 | 1/2007 | Hussain et al. | |
| 7,187,676 B2 | 3/2007 | DiMambro | |
| 7,197,553 B2 | 3/2007 | Roberts et al. | |
| 7,225,259 B2 | 5/2007 | Ho et al. | |
| 7,266,120 B2* | 9/2007 | Cheng et al. | 370/390 |
| 7,272,643 B1* | 9/2007 | Sarkar et al. | 709/222 |
| 7,280,560 B2 | 10/2007 | Bruckman et al. | |
| 7,313,614 B2 | 12/2007 | Considine et al. | |
| 7,324,489 B1 | 1/2008 | Iyer | |
| 7,376,125 B1* | 5/2008 | Hussain et al. | 370/352 |
| 7,463,633 B2 | 12/2008 | Endo et al. | |
| 7,522,604 B2* | 4/2009 | Hussain et al. | 370/392 |
| 7,574,495 B1* | 8/2009 | Rajagopalan | 709/223 |
| 7,639,632 B2* | 12/2009 | Sarkar et al. | 370/254 |
| 7,801,155 B2* | 9/2010 | Wang | 370/400 |
| 2001/0007560 A1 | 7/2001 | Masuda et al. | |
| 2001/0024425 A1 | 9/2001 | Tsunoda et al. | |
| 2001/0033580 A1 | 10/2001 | Dorsey et al. | |
| 2001/0034733 A1 | 10/2001 | Prompt et al. | |
| 2001/0043571 A1 | 11/2001 | Jang et al. | |
| 2001/0052013 A1 | 12/2001 | Munguia et al. | |
| 2002/0023171 A1 | 2/2002 | Garrett et al. | |
| 2002/0071389 A1 | 6/2002 | Seo | |
| 2002/0075901 A1 | 6/2002 | Perlmutter et al. | |
| 2002/0087713 A1 | 7/2002 | Cunningham | |
| 2002/0097677 A1 | 7/2002 | Hoar et al. | |
| 2002/0099849 A1 | 7/2002 | Alfieri et al. | |
| 2002/0116527 A1 | 8/2002 | Chen et al. | |
| 2002/0150093 A1 | 10/2002 | Ott et al. | |
| 2002/0150114 A1 | 10/2002 | Sainomoto et al. | |
| 2002/0152373 A1 | 10/2002 | Sun et al. | |
| 2002/0186661 A1 | 12/2002 | Santiago et al. | |
| 2003/0012209 A1 | 1/2003 | Abdelilah et al. | |
| 2003/0033401 A1 | 2/2003 | Poisson et al. | |
| 2003/0063590 A1 | 4/2003 | Mohan et al. | |
| 2003/0108041 A1 | 6/2003 | Aysan | |
| 2003/0115308 A1 | 6/2003 | Best et al. | |
| 2003/0117954 A1 | 6/2003 | De Neve et al. | |
| 2003/0118029 A1 | 6/2003 | Maher et al. | |
| 2003/0169747 A1 | 9/2003 | Wang | |
| 2003/0200295 A1 | 10/2003 | Roberts et al. | |
| 2003/0212735 A1 | 11/2003 | Hicok et al. | |
| 2003/0223406 A1 | 12/2003 | Balay | |
| 2004/0037279 A1 | 2/2004 | Zeliger | |
| 2004/0141521 A1 | 7/2004 | George | |
| 2004/0160900 A1 | 8/2004 | Lund et al. | |
| 2004/0199567 A1 | 10/2004 | Lund | |
| 2004/0199568 A1 | 10/2004 | Lund | |
| 2004/0199569 A1 | 10/2004 | Kalkunte et al. | |
| 2005/0002417 A1 | 1/2005 | Kelly et al. | |
| 2005/0055306 A1 | 3/2005 | Miller et al. | |
| 2005/0081059 A1 | 4/2005 | Bandini et al. | |
| 2005/0083955 A1 | 4/2005 | Guichard et al. | |
| 2005/0108340 A1 | 5/2005 | Gleeson et al. | |
| 2005/0113114 A1 | 5/2005 | Asthana | |
| 2005/0243798 A1 | 11/2005 | Dunn et al. | |
| 2006/0087969 A1 | 4/2006 | Santiago et al. | |
| 2006/0206713 A1 | 9/2006 | Hickman et al. | |
| 2008/0028456 A1 | 1/2008 | O'Rourke et al. | |
| 2008/0259936 A1 | 10/2008 | Hussain et al. | |
| 2008/0317040 A1 | 12/2008 | Balay et al. | |
| 2008/0317231 A1 | 12/2008 | Balay et al. | |
| 2008/0320553 A1 | 12/2008 | Balay et al. | |
| 2009/0007228 A1 | 1/2009 | Balay et al. | |
| 2009/0073977 A1 | 3/2009 | Hussain et al. | |
| 2009/0131020 A1 | 5/2009 | van de Groenendaal | |
| 2009/0238181 A1 | 9/2009 | Desai et al. | |
| 2009/0279567 A1 | 11/2009 | Ta et al. | |
| 2010/0142527 A1 | 6/2010 | Balay et al. | |
| 2010/0146098 A1 | 6/2010 | Ishizakl et al. | |
| 2010/0146627 A1 | 6/2010 | Lin | |
| 2010/0189016 A1 | 7/2010 | Millet | |
| 2010/0220732 A1 | 9/2010 | Hussain et al. | |
| 2010/0220741 A1 | 9/2010 | Desai et al. | |

OTHER PUBLICATIONS

Non-Final Rejection for U.S. Appl. No. 12/202,223 mailed Mar. 3, 2010.

Non-Final Rejection for U.S. Appl. No. 12/260,524 mailed Mar. 17, 2010.

Non-Final Rejection for U.S. Appl. No. 12/259,296 mailed Mar. 9, 2009.

Chan, Mun C. et al., "An architecture for broadband virtual networks under customer control." IEEE Network Operations and Management Symposium. Apr. 1996. pp. 135-144.

Chan, Mun C. et al "Customer Management and Control of Broadband VPN Services." Proc. Fifth IFIP/IEEE International Symposium of Integrated Network Management. May 1997. pp. 301-314.

Gasparro, D.M., "Next-Gen VPNs: The Design Challenge." Data Communications. Sep. 1999. pp. 83-95.

Hanaki, M. et al., "LAN/WAN management integration using ATM CNM interface." IEEE Network Operations Management Symposium, vol. 1. Apr. 1996. pp. 12-21.

Kapustka, S., "CoSine Communications Move VPNs 'Into the Cloud' with the Leading Managed IP Service Delivery Platform." http://wwwcosinecom.com/news/pr_5_24.html. Press Release, CoSine Communications. 1995. p. 5.

Keshav, S., "An Engineering Approach to Computer Networking: ATM networks, the internet, and the telephone network." Reading Mass: Addison-Wesley, Addison-Wesley Professional Computing Series. 1992. pp. 318-324.

Kim, E.C. et al., "The Multi-Layer VPN Management Architecture." Proc. Sixth IFIP/IEEE International Symposium on Integrated Network Management. May 1999. pp. 187-200.

Rao, J.R., Intranets and VPNs: Strategic Approach. 1988 Annual Review of Communications. 1998. pp. 669-674.

Tanenbaum, A.S., "Computer Networks." Upper Saddle River, N.J.: Prentice Hall PTR, 3rd Edition. 1996. pp. 348-364.

European Search Report for PCT/US03/37009 (Jul. 4, 2004) 2 pgs.

International Search Report for PCTUS03/17674. 6 pgs.

Final Rejection for U.S. Appl. No. 11/537,609 mailed Nov. 17, 2009.

Non-Final Office Action for U.S. Appl. No. 11/849,352 mailed Jul. 17, 2009.

Non-Final Office Action for U.S. Appl. No. 10/991,970 mailed May 18, 2009.

Non-Final Rejection for U.S. Appl. No. 11/557,096, mailed Jun. 30, 2010.

Non-Final Rejection for U.S. Appl. No. 11/460,977, mailed Jul. 2, 2010.

Non-Final Rejection for U.S. Appl. No. 12/202,333 mailed Jun. 21, 2010.

Non-Final Rejection for U.S. Appl. No. 12/637,140, mailed Sep. 17, 2010.

Non-Final Rejection for U.S. Appl. No. 12/537,898, mailed Sep. 9, 2010.

Non-Final Rejection for U.S. Appl. No. 12/202,223, mailed Sep. 16, 2010.

Final Rejection for U.S. Appl. No. 11/530,901 mailed Sep. 1, 2009.

Final Rejection for U.S. Appl. No. 11/616,243 mailed Sep. 15, 2009.

Office Action dated Nov. 28, 2007 for U.S. Appl. No. 09/952,520.

(56) References Cited

OTHER PUBLICATIONS

Office Action dated Oct. 16, 2007 for U.S. Appl. No. 09/661,130.
Office Action dated Oct. 18, 2007 for U.S. Appl. No. 09/663,483.
IEEE Potentials Publication; "Local Area Networks" Dec. 95/Jan. 96; pp. 6. http://www.ece.uc.edu/-paw/potentials/sample.
Lawrence, J. Lang et al."Connecting Remote FDDI Installations with Single-Mode Fiber, Dedicated Lines, or SMDS." Jul. 1990; ACM SIGCOMM Computer Communication Review. vol. 20, Issue 3; pp. 72-82.
Non-Final Office Action for U.S. Appl. No. 10/991,969 mailed Apr. 27, 2009.
Non-Final Office Action for U.S. Appl. No. 11/684,614 mailed Apr. 24, 2009.
Non-Final Rejection for U.S. Appl. No. 12/123,443 mailed Jan. 27, 2010.
Non-Final Rejection for U.S. Appl. No. 10/991,970 mailed Jan. 12, 2010.
Non-Final Rejection for U.S. Appl. No. 10/991,970 mailed Dec. 31, 2009.

* cited by examiner

HIERARCHICAL METERING IN A VIRTUAL ROUTER-BASED NETWORK SWITCH

CROSS-REFERENCE TO RELATED APPLICATIONS

This application is a continuation of U.S. application Ser. No. 11/621,102 filed on Jan. 8, 2007, now U.S. Pat. No. 7,668,087, which is a continuation of U.S. application Ser. No. 10/163,162 filed on Jun. 4, 2002, now U.S. Pat. No. 7,161,904, both of which are hereby incorporated by reference for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright® 2002-2009, Fortinet, Inc.

BACKGROUND

1. Field

Embodiments of the present invention generally relate to data communications, and in particular, packet metering and rate limiting in a network processor environment, computer security, and in particular to computer network security.

2. Description of the Related Art

In a multi-client network, many subscribers and groups of subscribers are required to share a limited bandwidth of communication channels. Switches within the multi-client network must balance these shared bandwidth resources among multiple subscribers in a fair manner. Conventional routers attempt to solve this problem by performing packet metering/rate limiting on each physical interface of a routing or forwarding instance. Packet metering is conventionally used to limit the rate at which packets are placed on a network for transmission.

In the case of a multi-client network, for example, it may be desirable to meter and/or identify customers, or certain groups of customers, that are oversubscribing (e.g., using more than their allocated bandwidth). This may not be possible with conventional packet metering because metering is performed at a single physical interface. Another limitation of these conventional metering approaches is that they are not able to support packets that are associated with a variety of virtual interfaces, which may be employed by a virtual router.

Thus, there is a general need for an improved system and method for performing metering in a virtual router based network switch. There is also a general need for a system and method for performing metering in a multi-client network that distinguishes between clients and groups of clients. There is also a need for a system and method that supports a fair sharing of communication resources.

SUMMARY

Methods and systems are described for applying metering and rate-limiting in a virtual router environment and extending the concept of metering/rate-limiting to support a hierarchy of metering/rate-limiting contexts per packet flow. According to one embodiment, a method of metering packet flows in a virtual routing platform is provided. The method may comprise performing a first level of metering on packets of a first packet flow using a first metering control block (MCB). The first level of metering may be one level of metering in a hierarchy of metering levels. The method may also comprise performing a second level of metering on the packets of the first packet flow and packets of a second packet flow using a second MCB. The second level of metering may be another level of metering in the hierarchy.

In one embodiment, the method comprises identifying packets of the first packet flow. The packet flow may have the first MCB associated therewith stored in a cache memory. In this embodiment, the method may also include placing a cache-lock on the first MCB prior to performing the first level of metering. The first and second MCBs may be data structures stored in a shared memory of the virtual routing platform. The method may further comprise placing a cache-lock on the second MCB prior to performing the second level of metering of packets of either the first or second packet flow using the second MCB. The cache-lock may be released on the first MCB after performing the first level of metering on the first packet flow using the first MCB, the cache lock may be released on the second MCB after performing the second level of metering on either the first or second packet flows using the second MCB.

In one embodiment, the method may further comprise performing a first level of metering on packets of the second packet flow using a third MCB prior to performing the second level of metering on packets of the second packet flow. The third MCB may be associated with the first level of metering in the hierarchy. A cache-lock may be placed on the third MCB prior to performing the first level of metering on the packets of the second packet flow using the third MCB. The first MCB may be retrieved from memory prior to placing the cache lock on the first MCB. The second MCB may be retrieved from memory prior to placing the cache lock on the second MCB. The third MCB may be retrieved from memory prior to placing the cache lock on the third MCB. The cache lock may be released on the third MCB after performing the first level of metering on packets of the second packet flow using the third MCB.

In one embodiment, placing the cache-lock on the first MCB may comprise setting a lock-bit of a first cache line index in a cache tag store, the first cache line index identifying the first MCB in the cache memory.

In one embodiment, the virtual routing platform may be a multiprocessor system utilizing a shared memory having a first processor to perform the first level of metering on a first packet flow and a second processor to perform a first level of metering on a second packet flow. The first and second MCBs may be stored in a memory shared by the first and second processors. The first level of metering may be performed in parallel. In one embodiment, a virtual routing engine may be shared by a plurality of virtual router contexts running in a memory system of a CPU of the virtual routing engine. In this embodiment, the first packet flow may be associated with one virtual router context and the second packet flow is associated with a second virtual router context. The first and second routing contexts may be of a plurality of virtual router contexts resident in the virtual routing engine.

The first level of metering may comprise measuring a packet rate of the first packet flow against a first set of rate parameters established for the first packet flow and stored in the first MCB, and marking packets of the first packet flow in accordance with a result of the measuring. Performing the second level of metering may comprise measuring packet rates of both the first and second packet flows against a second set of rate parameters established for the second level of metering and stored in the second MCB, and dropping packets of both the first and second packet flows when packets of the first or second packet flows together exceed at least one of the parameters of the second set. The method may also comprise refraining from dropping packets of the first packet flow when packets of the first flow exceed rate parameters of the first set and when, for example, packets of the first or second packet flows together do not exceed the at least one of the parameters of the second set.

In one embodiment, the rate parameters of the first and second set may include at least one of either a peak information rate (PIR) or a committed information rate (CIR) established for the associated packet flow. In this embodiment, measuring may comprise removing tokens from a token bucket established based on the measured packet rate. The token bucket may have a size based on one of either the PIR or CIR for the associated packet flow.

In another embodiment, the method may also comprise identifying packets of the first and second packet flows that support a service, and performing a third level of metering on packets identified as supporting the service. The service may comprise, for example, either Internet Protocol security (IPSec) packets, access control list (ACL) packets or video packets.

In at least some of these embodiments, identifying packets may comprise performing a hash on a received packet to determine an index corresponding with a flow classification block for a packet flow. In other embodiments, the present invention provides a virtual routing engine, which may be comprised of a plurality of multiprocessor systems. The virtual routing engine may also comprise a line interface to receive packets of a plurality of packet flows, and a switching fabric coupling the plurality of multiprocessor systems and the line interface. The line interface may select one of the multiprocessor systems for a first packet flow and may direct packets through the switching fabric to the selected multiprocessor system. The selected multiprocessor system may perform a first level of metering on packets of the first packet flow using a first metering control block (MCB). The first level of metering may be one level of metering in a hierarchy of metering levels. The selected multiprocessor system may perform a second level of metering on the packets of the first packet flow and packets of a second packet flow using a second MCB. The second level of metering may be another level of metering in the hierarchy.

In one embodiment of the virtual routing engine, the selected multiprocessor system may perform a first level of metering on packets of the second packet flow using a third MCB prior to performing the second level of metering on packets of the second packet flow. The third MCB may be associated with the first level of metering in the hierarchy. The first and second MCBs may be data structures stored in a shared memory of the selected multiprocessor system. The selected multiprocessor system may place a cache-lock on the first MCB prior to performing the first level of metering. It may also place a cache-lock on the second MCB prior to performing the second level of metering of packets of either the first or second packet flow using the second MCB. It may release the cache-lock on the first MCB after performing the first level of metering on the first packet flow using the first MCB, and may release the cache lock on the second MCB after performing the second level of metering on either the first or second packet flows using the second MCB.

In one embodiment, a first processor of the selected multiprocessor system may perform the first level of metering on a first packet flow, and a second processor may perform a first level of metering on a second packet flow. The first levels of metering may be performed in parallel as part of one stage of pipelined processing, and a second level of metering may be performed as part of another stage of pipelined processing performed by another processor or one of either the first or second processors of the selected multiprocessor system.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
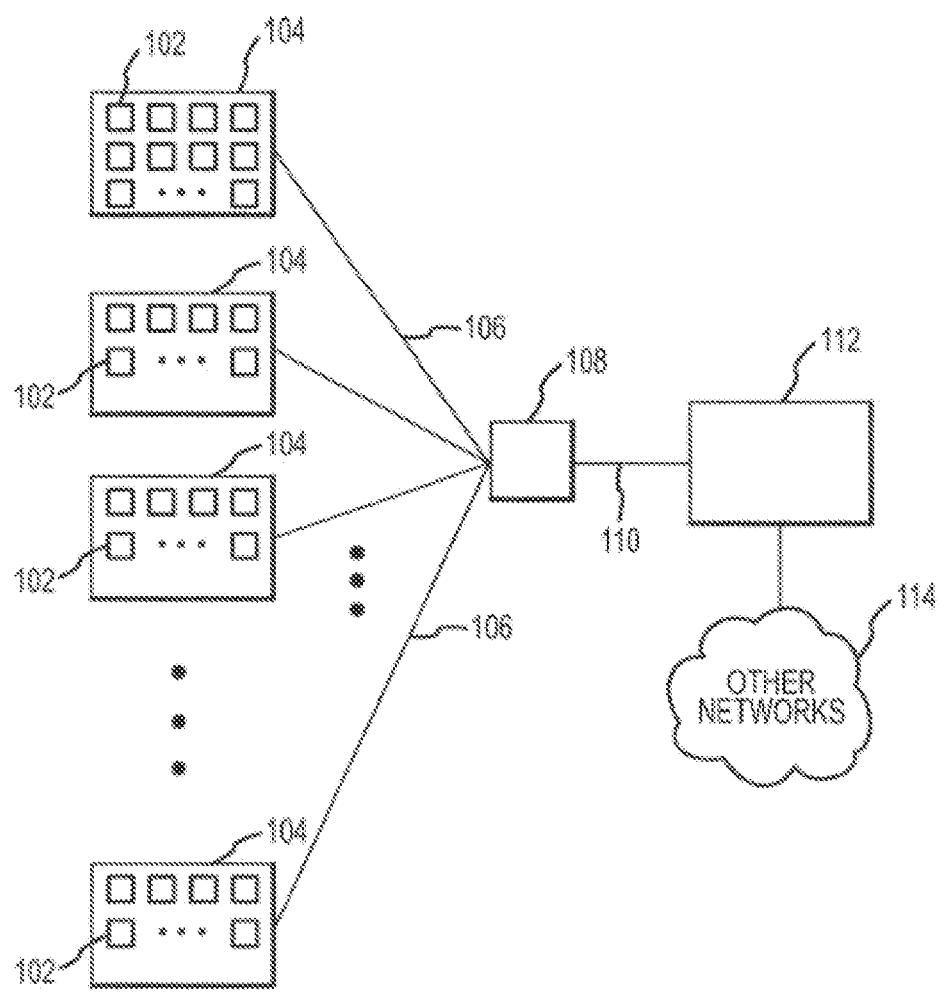
FIG. 1 illustrates a portion of a network communication system in accordance with an embodiment of the present invention.

Methods and systems are described for applying metering and rate-limiting in a virtual router environment and extending the concept of metering/rate-limiting to support a hierarchy of metering/rate-limiting contexts per packet flow.

The following description and the drawings illustrate specific embodiments of the invention sufficiently to enable those skilled in the art to practice it. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of the invention encompasses the full ambit of the claims and all available equivalents.

The present invention provides, among other things, a system and method for packet metering. In one embodiment, a hierarchy of metering control blocks may be used to rate limit packet flows from individual communication devices and/or groups of communication devices. In this embodiment, packet flow profiles may be established for a service provider, for example, as well as for customers serviced by the service provider. In one example, metering operations may indicate that any one or more customers may be exceeding their individual profiles, however these packets may not necessarily be dropped when a next level of metering indicates that the service provider is not exceeding its packet flow profile. The service provider or the system may set metering and rate-limiting policies.

According to one embodiment, metering is performed based on packet flows of a particular service. For example, a first metering operation may be performed on IP security protocol (IPSec) packets, while other metering operations may be performed on packet flows of other services such as video, Voice over IP (VoIP), or multicasting, allowing rate limiting of traffic associated with any one or more of the services.

In one embodiment, a routing system performs ingress metering on packets when entering a virtual routing engine (VRE), and performs egress metering on packets after header transformation prior to leaving the VRE. In this embodiment, the ingress metering and egress metering may include a hierarchy of metering operations. The virtual routing platform may be a multiprocessor system utilizing a shared memory having a first processor and a second processor to perform levels of metering in parallel. In one embodiment, a virtual routing engine may be shared by a plurality of virtual router contexts running in a memory system of a CPU of the virtual routing engine. In this embodiment, the first packet flow may be associated with one virtual router context and the second packet flow is associated with a second virtual router context. The first and second routing contexts may be of a plurality of virtual router contexts resident in the virtual routing engine.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable medium having stored thereon instructions, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

Terminology

Brief definitions of terms used throughout this application are given below.

The terms "connected" or "coupled" and related terms are used in an operational sense and are not necessarily limited to a direct connection or coupling.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The term "responsive" includes completely or partially responsive.

FIG. 1 illustrates a portion of a network communication system in accordance with an embodiment of the present invention. Network communication system 100 may be a multi-client network that supports packetized communications between communication devices 102, which may be within a particular network or group 104. Communication devices 102 may be any client device and may include any data communication device or terminal. Communications from devices 102 or groups 104 may be sent over one or more of channels 106 to fabric 108. Fabric 108 may transport communications for transmission over communication channel 110 for receipt by one or more virtual routers (VRs), which may be implemented by a virtual routing platform 112. Virtual routing platform 112 may provide for packet routing and switching through one or more physical interfaces. Virtual routing platform 112 may also provide for packet routing and switching with other networks 114. Virtual routing platform 112 may perform various levels of packet flow metering and rate limiting as further described herein. In one embodiment, virtual routing platform 112 may be self contained subsystem with an advanced service processing architecture for delivering network-based IP services such as virtual private networks (VPNs) and managed firewall at multi-gigabit per second rates (e.g., OC-48 level) and greater (e.g., OC-192 level). In one embodiment, virtual routing platform 112 may serve as an IP service generator (IPSG) system.

Communication channel 106 may be any communication channel and in one embodiment, channel 106 may support T-1 level communications (e.g., approximately 1.54 MBPS) although other levels of communications may also be supported. In one embodiment, individual communication devices 102 may communicate through group 104 with virtual routing platform 112 using any communication technique, including Ethernet, frame relay, cable, DSL, etc.

Channel 110 may support communications of up to digital signal levels such as DS-1 (approximately 2.048 Mbps), DS-2 (approximately T-2), DS-3 (approximately 44.7 Mbps), DS-4 (approximately 274 Mbps) and even greater. Other communication levels may also be supported by channel 110. DS-4, for example, may be the equivalent of 4032 standard voice channels. In one embodiment, the bandwidth of channel 110 is at least as great as the sum of the bandwidths of each of channels 106.

Although virtual routing platform 112 is referred to as a "virtual" routing platform, virtual routing platform 112 performs actual routing of packets through the use of one or more single physical interfaces that may operate as several virtual interfaces. Furthermore, virtual routing platform 112 may implement one or more virtual routers. In other words, multiple virtual routers may be running on virtual routing platform 112. Packet flows may be established for any one or more communication devices 102, or groups 104, as well as for services. Although system 100 illustrates only two levels of communications (e.g., communication devices 102 and groups 104 comprised of communication devices 102), embodiments of the present invention are equally suitable for almost any number of levels of communications. For example, each communication device 102 may represent a group of communication devices, groups 104 may be further grouped into higher levels of communication elements. In this way, metering and rate limiting may be performed for any one or more levels of communication devices, as well as for any one or more types of services. In one embodiment of the present invention, packet profiles may be established for packet flows from devices 102, or groups 104.

Figure 2:
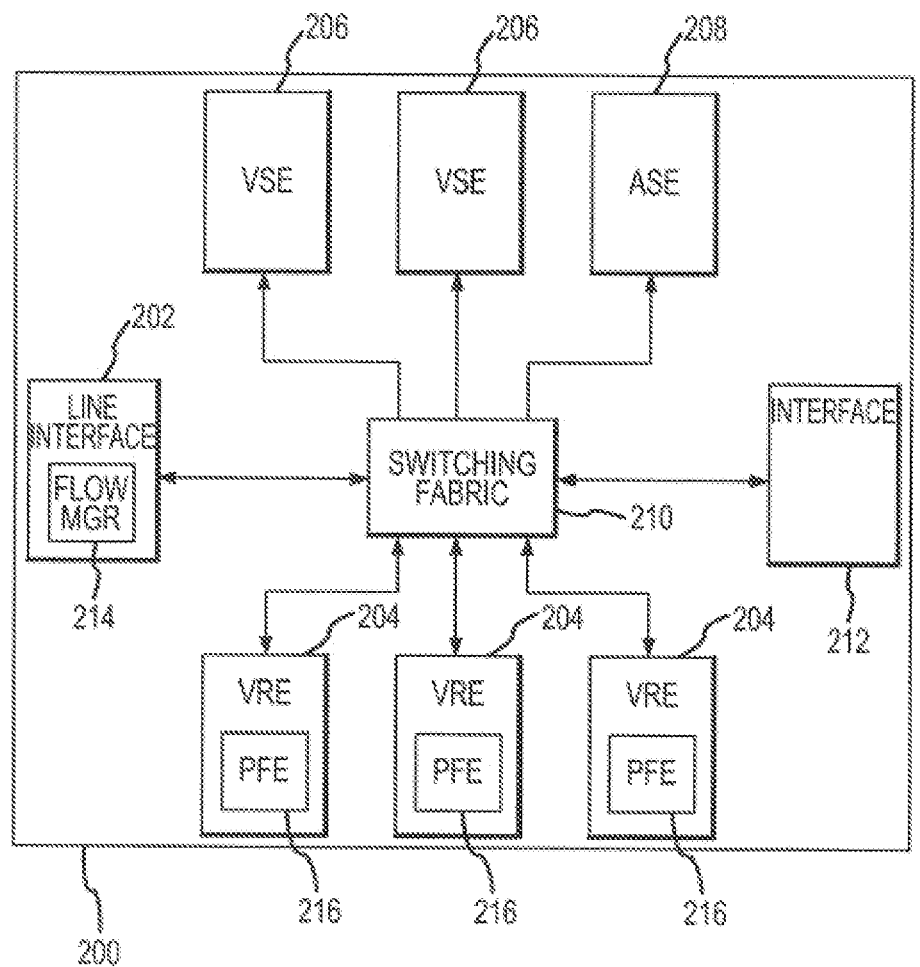
FIG. 2 is a functional block diagram of a virtual routing platform in accordance with an embodiment of the present invention.

FIG. 2 is a functional block diagram of a virtual routing platform in accordance with an embodiment of the present invention. Virtual routing platform 200 may be suitable for use as virtual routing platform 112 (FIG. 1) although other systems may also be suitable. Virtual routing platform 200, among other things, may provide hardware-based network processor capabilities and high-end computing techniques, such as parallel processing and pipelining. Virtual routing platform 200 may include one or more line interfaces 202, one or more virtual routing engines (VREs) 204, one or more virtual service engines (VSEs) 206, and one or more advanced security engines (ASEs) 208 coupled by switching fabric 210. Virtual routing platform 200 may also include interface 212 which may interface with other virtual routing platforms.

In one embodiment, virtual routing platform 200 may implement one or more virtual routers (VRs), which may, for example, run on a CPU of one or more of VREs 204. A VR, for example, may be a software context that is resident in the CPU's memory system. The software context may include all the state and processes found in a conventional router, however hundreds or more of these virtual router contexts may be overlaid onto a single CPU memory system. Accordingly, a single hardware element may provide the context of many VRs to be shared allowing one piece of hardware, such as virtual routing platform 200, to function as up to a hundred or even a thousand or more actual routers.

Line interface 202 may receive packets of different packet flows from a communication channel such as communication channel 110. VREs 204 may perform packet classification, deep packet inspection, and service customization. In one embodiment, VRE 204 may support up to one million or more access control list (ACL) level packet flows. VREs 204 may include a virtual routing processor to provide hardware assisted IP packet forwarding, multi-protocol label switching (MPLS), network address translation (NAT), differentiated services (DiffServ), statistics gathering, metering and marking. VREs 204 and VSEs 206 may include a virtual service controller to support parallel processing and pipelining for deep packet inspection and third-party application computing.

VSEs 206 may perform parallel processing and/or pipelining, and other high-end computing techniques, which may be used for third party applications such as firewall services and anti-virus services. ASEs 208 may provide for hardware and hardware assisted acceleration of security processing, including encryption/decryption acceleration for IP security protocol type (IPSec) packet flows and virtual private networks (VPNs). Switching fabric 210 may be a high-capability nonblocking switching fabric supporting rates of up to 51.2 Gbps and greater.

Line interface 202 may include flow manager 214 to load balance service requests to VSEs 206 and VREs 204, and may support robust priority and/or weighted round robin queuing. In one embodiment, flow manager 214 may provide for service load balancing and may dynamically determine one of VREs 204, which may best handle a certain packet flow. Accordingly, all packets of a particular flow may be sent to the same VRE 204. Line interface 202 may identify one of the VREs to process packets of a first packet flow based on a physical interface and virtual channel from which the packets of the first packet flow were received. The identified VRE may perform ingress metering, header transformation and egress metering for packets of the first packet flow. In one embodiment, hardware based metering and marking using a dual token bucket scheme assists in rate-control capabilities of system 200. This may allow for granular application level support and the ability to provide strong performance based service level agreements (SLAs).

In one embodiment, VRE 204 supports DiffServ quality of service (QoS) including rate control that includes packet rate metering, marking and dropping functions. Rate control may include ingress rate control, which may be based on the virtual interface (VI) and may be performed before the packet is routed. Rate control may also be based on the flow to which the packet belongs (i.e., packet flow). Rate control may also include egress rate control, which may be performed after the packet is routed and forwarded. Rate metering and marking may be implemented substantially in hardware for each packet flow.

In one embodiment, VRE 204 may provide metering and marking in accordance the Network Working Group's Request For Comment (RFC) 2698 dated September 1999, which describes a two-rate, three-color marker (trTCM) scheme. In these embodiments, a particular header field of a packet may be marked with a marker to indicate whether the packet is green, yellow, or red. VRE 204 may support color-blind and color aware modes. In a color-blind mode, an incoming packet's color may be ignored and any color may be added to the packet. In a color-aware mode, an incoming packet's color may be taken into consideration. Packets marked green may have the lowest probability of being dropped and may be dropped last if necessary. When an incoming packet is marked green, the packet may stay green, or may be downgraded to yellow or red. In this mode, packets are generally never upgraded. A packet may be marked red when it exceeds a peak information rate (PIR), which may be defined for the packet flow. Otherwise, the packet may be marked either yellow or green depending on whether it exceeds a committed information rate (CIR), which may be defined for the packet flow. This scheme may be used, for example, for ingress policing of a service when the peak rate may need to be enforced separately from the committed rate. In one embodiment, the packet's color may be encoded in an internal control header of the packet and may be interpreted by the flow control manager of line interface 202 to help provide congestion control. A metering context may be stored in memory in the form of metering control blocks (MCBs). The metering context may include status and state information for a particular packet flow, and may include a number of bytes metered as green, yellow and red, and, among other things, the PIR and CIR in bytes per time-slot. The metering context may be updated every time a packet is processed by one of VREs 202.

Different packets may take different paths through virtual routing platform 200 and may not necessarily require the resources of all the various functional elements of virtual routing platform 200. In one embodiment, a packet, such as a virtual local area network (VLAN) Ethernet packet, may arrive at an input port of line interface 202. The input port may be a gigabit Ethernet input port, which may be one of several input ports. The flow manager may program a steering table look-up to determine which VLAN is associated with a particular one of VREs 204. The flow manager may tag the packet with an internal control header and may transfer the packet from line interface 202 across switching fabric 210 to the selected VRE 204. A service controller of VRE 204 may perform deep packet classification and extract various fields on the packet header. A flow cache may be looked up to determine whether the packet should be processed in hardware or software. If the packet is to be processed in hardware, an index to the packet processing action cache may be obtained. Ingress metering is performed and statistics are registered as part of ingress flow processing.

The packet may be deposited via a high-speed direct access memory (DMA) into the VRE's main memory. A routing processor may retrieve the packet, identify the packet processing actions and may perform actions, such as time-to-live decrementing, IP header and checksum updating, and IP forwarding patch matching. Egress statistics counters may also be updated. The packet may be forwarded to one of ASEs 208 for security operations. The packet may also be forwarded to another one of VREs 204.

As the packet leaves a VRE, egress statistics may be generated, metering and marking may be performed, maximum transmit unit size may be enforced and packet fragmentation may be implemented. An egress flow manager may also apply priority queuing based on marking and may transmit the packet out of virtual routing platform 200.

In one embodiment, packet-forwarding engine (PFE) 216 may be included within one or more of VREs 204. PFE 216 may be logically situated between a switch fabric interface and a DMA Engine, and may be partitioned into an ingress and egress unit. The PFE ingress unit may process incoming packets from the switch fabric and may transfer them to the DMA Engine ingress. The PFE egress unit may process outgoing packets from the DMA Engine egress and may transfer them to the switch fabric. Both the ingress and egress units may have direct access to memory. PFE 216 may operate synchronously to a CPU interface and a memory system.

A micro-architecture of both the PFE ingress and egress units may be comprised of an array of packet processors that may share an on-chip write-back cache. This packet processor may implement a RISC-like integer instruction set with special instructions for bit field extraction and merging and for unaligned block data transfers. Each packet processor may operate on a different packet and hardware interlocks maintain packet order. The ingress processors may share common micro-code for ingress processing and the egress processors may share common micro-code for egress processing. The PFE memory may map the ingress and egress instruction stores and may supports micro-code updates.

The PFE ingress unit may pass forwarding state information to the DMA Engine which may incorporates this state into a packet receive descriptor. This forwarding state may indicate whether the CPU should software forward the packet or the packet may bypass the CPU and PFE 216 can hardware forward the packet. The forwarding state may also includes a 20-bit index into a forwarding transform cache that describes PFE processing per packet micro-flow. For software forwarded packets, the receive descriptor may be pushed onto the DMA ingress descriptor queue. For hardware forwarded packets, the descriptor may bypass the DMA ingress queue and may be pushed directly onto the DMA egress descriptor queue as a transmit descriptor.

The PFE ingress unit may support two basic forms of packet classification. One form includes flow-based packet classification, using various fields of the LQ header along with fields in the L3/L4 headers to identify a particular virtual router (VR) micro-flow. The other form may use the upper bits of the IP address or MPLS label to index a table of flow indices. The host software may control which classification form the PFE uses by programming different micro-code into the ingress instruction store. In both forms, the classification result may be a 20-bit forwarding index that the hardware may use to select the correct packet transformations.

Each flow ID cache entry may store the LQ ID, LQ protocol, L3, and L4 fields that identify a particular VR micro-flow along with state indicating whether to hardware or software forward packets belonging to the micro-flow. The PFE ingress unit may generate an index into the flow ID cache by hashing the incoming packet's LQ ID, LQ protocol, L3, and L4 header fields. It may look-up the indexed cache entry and compares the packet micro-flow ID fields to the cached micro-flow ID fields. On a cache hit, a forward action field of the cache entry may indicate whether to software or hardware forward the packet. On a cache miss, the ingress controller may allocate a cache entry and may forward the packet to software for flow learning.

Figure 3:
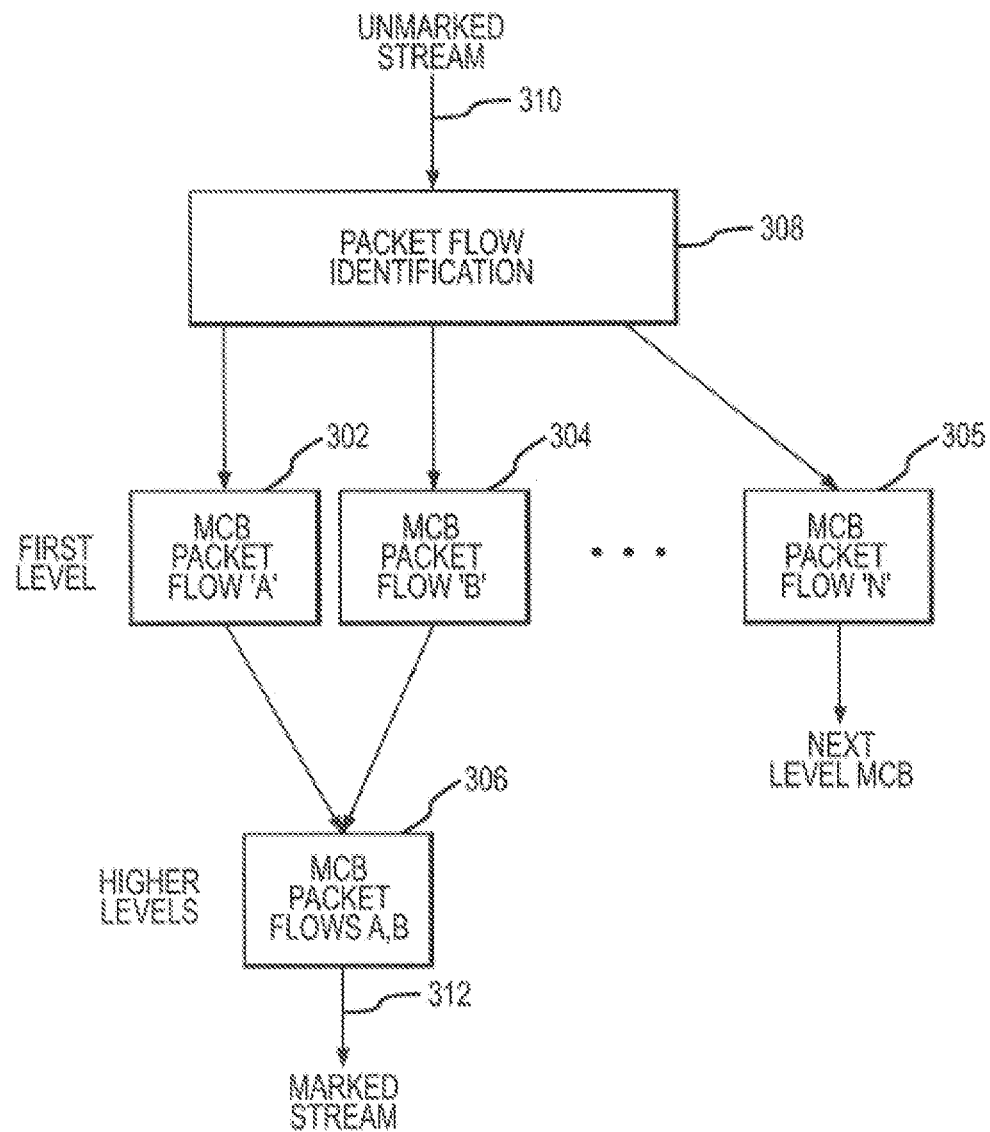
FIG. 3 illustrates a hierarchy of metering control blocks in accordance with an embodiment of the present invention.

FIG. 3 illustrates a hierarchy of metering control blocks in accordance with an embodiment of the present invention. Hierarchy 300 may include a hierarchy of metering control blocks (MCBs) to perform metering on packets of various packet flows. For each packet, a packet flow may be identified by packet flow identifier 308. The metering performed by the MCBs of hierarchy 300 may be performed as part of ingress metering or egress metering described above, and may be performed by one of VREs 204 of virtual routing platform 200 (FIG. 2), although other devices are also suitable.

Hierarchy 300 may include metering control blocks (MCBs), which may be defined for each packet flow. For example, MCB 302 may be defined for packet flow 'A', and MCB 304 may be defined for packet flow 'B'. MCB 302, MCB 304 and 305 may represent a first level of MCB and may correspond with a first level of packet flows. This first level of MCB may include many hundred or even thousands of MCBs, however only two are illustrated in FIG. 3 for ease in understanding an embodiment of the present invention. Hierarchy 300 may also include a second level of MCBs, which may include MCB 306. MCB 306 may be defined for a group of packet flows, such as packet flows 'A' and 'B' as illustrated. This second level of MCBs may also include many hundred or even thousands of MCBs. Hierarchy 300 may also include higher level MCBs (not illustrated) to meter higher level packet flows.

In one embodiment, first level MCBs 302 and 304 may meter packet flows from individual level devices, such as communication devices 102 (FIG. 1), while second level MCB 306 may meter group level packet flows, such as packet flows from one of groups 104 (FIG. 1). Other MCBs may meter packet flows for particular services and may also be arranged in a hierarchy. Although hierarchy 300 illustrates that packets from lower level flows are also part of higher-level flows and metered by higher-level MCBs, this is not a requirement. For some packet flows, only one level of metering may be performed.

In one embodiment, a packet flow may be identified for unmarked packet stream 310, and hierarchy 300 may mark the packets to provide marked packet stream 312. Unmarked packet stream 310 may include pre-marked or pre-colored packets as discussed above.

In one embodiment, VRE 204 (FIG. 2) may include packet-forwarding engine (PFE) 216 (FIG. 2) that includes an egress unit to independently rate limit ingress and egress packets, when enabled. As part of rate limiting, the PFE may meter, mark and drop packets. The PFE may also perform ingress rate limiting before header transformation, and may perform egress rate limiting after header transformation. Software may control the metering and rate marking using a combination of MCBs, such as MCBs 304, 306 and/or 308, fields in a transform control block (TCB) and ingress statistic blocks.

In one embodiment, the PFE may implement both ingress and egress rate metering and marking according to the two-rate three-color marker (trTCM) discussed above. In this embodiment, in a color-blind mode, the PFE marks the drop precedence color of a packet as green if it does not exceed a committed burst size (CBS), yellow if it exceeds the CBS but not a peak bust size (PBS), and red if it exceeds both CBS and PBS. The packet's color may be encoded into an rm field of an LQ header. The PFE may increment a committed (C) and peak (P) token buckets by the CIR and PIR values, respectively, in 1 ms intervals, for example. In one embodiment, the PFE egress unit may optionally drop Yellow or Red packets or may color packets for a downstream dropper. RateInCtl and RateOutCtl fields of the TCB may designate whether and how to drop packets on ingress and egress rate limiting.

MCBs may be maintained in system memory for each packet flow. Table 1 is an example of an MCB data structure in accordance with an embodiment of the present invention. Hardware may provide at least three logical metering units: Virtual interface (VI) based ingress metering, flow-based ingress metering, and flow-based egress metering. The TCB may also contain two MCB pointers for flow-based metering. The VI-based MCB pointer may be contained in the VI-based stats block discussed in more detail below.

TABLE 1

Example Metering Control Block

| Word | Bits | Name | Description |
|---|---|---|---|
| 0 | 31:0 | Green_bytes (lower) | Bottom 32 bits of green-metered bytes count |
| 1 | 31:0 | C-tokens | Number of bytes in C token bucket |
| 2 | 31:0 | P-tokens | Number of bytes in P token bucket |
| 3 | 31:0 | Metered_pkts (lower) | Bottom 32 bits of metered packet count. |
| 4 | 31:0 | Yellow_bytes (lower) | Bottom 32 bits of yellow-metered bytes count. |
| 5 | 31:0 | Red_bytes (lower) | Bottom 32 bits of red-metered bytes count. |
| 6 | 31:0 | Timeslot | 1 ms timeslot value. |
| 7 | 31:0 | Reserved | |
| 8 | 31:0 | CIR | Committed information rate in bytes/timeslot. |
| 9 | 31:0 | PIR | Peak information rate in bytes/timeslot. |
| 10 | 31:0 | CBS | Committed burst size in bytes. |
| 11 | 31:0 | PBS | Peak burst size in bytes. |
| 12 | 63:32 | Metered_pkts (upper) | Upper 32 bits of metered packet count. |
| 13 | 63:32 | Green_bytes (upper) | Upper 32 bits of green-metered byte count. |
| 14 | 63:32 | Yellow_bytes (upper) | Upper 32 bits of yellow-metered byte count. |
| 15 | 63:32 | Red_bytes (upper) | Upper 32 bits of red-metered byte count. |

Software may control where and how the hardware accesses MCBs by setting up arrangements of MCB pointers. The MCB pointer data structure may contain a 32-byte aligned memory pointer along with mode control bits as detailed in the table 2 below. The pointer field may indicate a memory location of a single MCB, alternatively, the pointer field may indicate the location of an ordered array of up to eight or more MCB pointers. When the hardware loads an MCB pointer array, it may perform metering and rate marking starting with the first MCB pointer and continuing as directed by the Next Pointer field in the MCB pointer. Software may disable rate marking, for example, by setting all four bytes of MCB pointer to 0. The lowest five bits may be masked out before using this 4-byte word as the memory pointer.

TABLE 2

MCB Pointer Format

| Bit Field | Name | Description |
|---|---|---|
| 31:5 | Memory | This field contains a memory pointer to an MCB, Pointer an MCB pointer array, or a Rate Marking Translation Table. The Metering Mode field determines which mode to use. This pointer may be 32-byte aligned. |
| 4:3 | Metering Mode | This field determines to what structure the Memory Pointer field points: 0: MCB - Color Blind 1: MCB - Color Aware 2: MCB Array 3: Reserved |
| 2:1 | Drop Policy | This field indicates the traffic policing policy: 0: No dropping 1: Drop on red marking only 2: Drop on yellow or red marking 3: Reserved |
| 0 | Next Pointer | This field indicates whether the hardware may continue to the next MCB pointer in an array: 0: Stop after the current pointer 1: Continue to the next MCB pointer in the array. |

In one embodiment, software may embed the MCB pointer for the VI-based ingress metering in a reserved field of the VI-based ingress stats block. Software may provide that this reserved field of the stats block may be initialized to 0 in the case where metering may be not enabled. In another embodiment, VI-based statistics block may also contain two MCB pointers for metering traffic bound for software. One pointer may be for best effort traffic and the other may be used for control traffic. Software may initialize these pointers to 0 when metering is not enabled.

When IP/MPLS packets arrive at the ingress, the PFE may use a QOS pointer in the VI-based ingress stats block. This pointer may indicate how the hardware translates an incoming TOS/EXP field into the LQ header's PRI and RM fields. If the pointer is NULL then, the translation may be skipped. Similarly, as a final step before transmitting an IP/MPLS packet, the hardware may take the updated LQ header PRI and RM fields and may reverse translate these back to the packet's TOS/EXP field. If the QOS pointer is NULL, then the translation may be skipped. The ingress QOS translation pointer may reside in the last four bytes of the VI-based ingress stats block. For IP packets the ingress table may be comprised of 256 entries, which may be indexed by the incoming packet's IP header TOS field. For MPLS packets, the ingress table may be comprised of eight or more entries, which may be indexed by the incoming packet's MPLS EXP field. Each entry may be 8 bytes wide (4B mask, 4B value).

An egress QOS translation pointer may reside in word 12 of the associated TCB. The egress table be comprised of 32 entries indexed by the concatenation of the outgoing packet's {RM, PRI} SF header fields (the RM bits reside in the MSB of the table index). Each entry may be 8 bytes wide (4B mask, 4B value).

Figure 4:
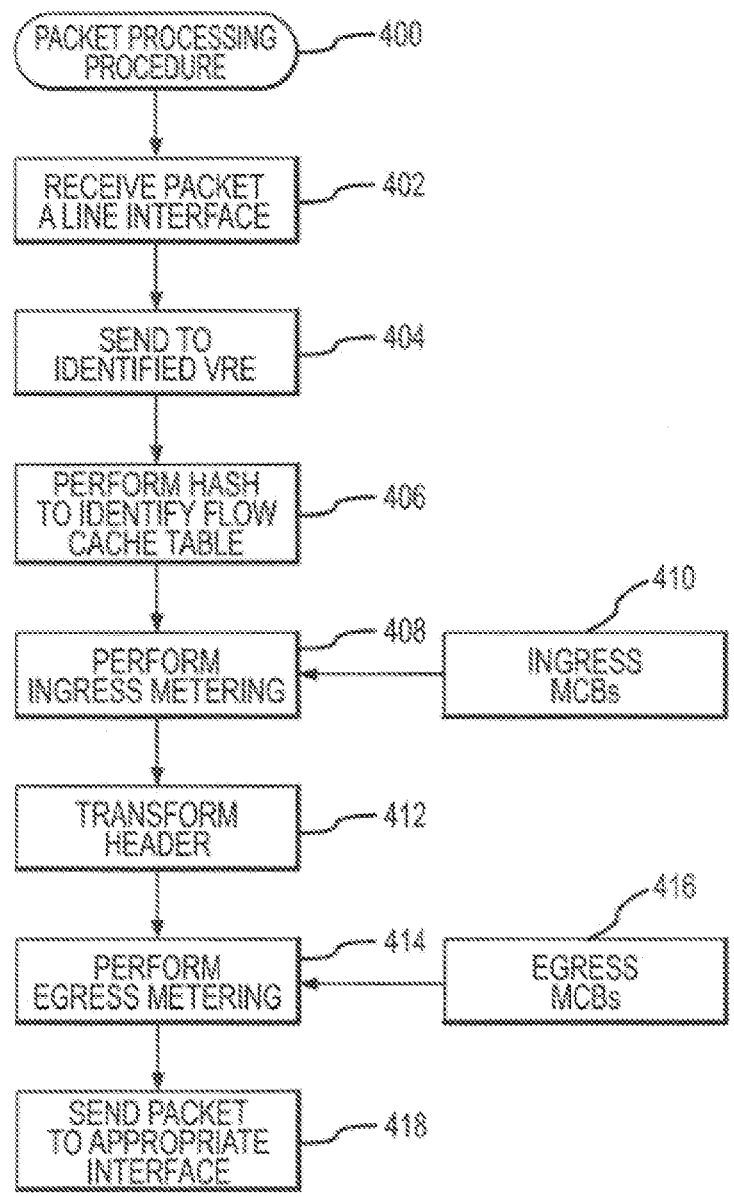
FIG. 4 is a flow chart of a packet processing procedure in accordance with an embodiment of the present invention.

FIG. 4 is a flow chart of a packet processing procedure in accordance with an embodiment of the present invention. Packet processing procedure 400 may be performed by VRE 204 (FIG. 2) although other routing engines and devices may also be suitable for performing procedure 400. In one embodiment, procedure 400 is performed by a packet-forwarding engine (PFE) of VRE 204 in a packet-processing pipeline. In general, packets of various packet flows are received, various levels of ingress metering may be performed, headers may be transformed, and various levels of egress metering may be performed before the packet is sent on to its destination. Although the individual operations of procedure 400 are illustrated and described as separate operations, one or more of the individual operations may be performed concurrently and nothing requires that the operations be performed in the order illustrated.

In operation 402, a packet is received at one of the physical ports of a line interface, such as line interface 202 (FIG. 2). The packet may be part of a particular packet flow known to the virtual router. As part of operation 402, a flow manager of the line interface may identify a particular VRE, such as one of VREs 204 (FIG. 2), designated for handling the packet flow, and in operation 404, the packet may be sent to the identified VRE. In operation 406, a packet-forwarding engine of the VRE may perform a hash to generate an index for a flow classification block (FCB), which may point to an entry in a flow cache table. Each packet flow may have a separate FCB entry defining the packet flow. The table may identify a packet profile and may identify the various levels of metering which may be performed for the packet flow. In one embodiment, a flow classification may be added as part of descriptor layer field of the packet to indicate which metering operations are to be performed on the packet. In one embodiment, a metering policy may have been used to establish which metering operation should be performed.

In operation 408, one or more levels of ingress metering operations may be performed on the packet. In one embodiment, the ingress metering of operation 408 may be performed per virtual interface (VI) basis. In an alternate embodiment, the metering may utilize one or more MCBs 410, such as MCBs 302 and/or 306, or more, as defined for the packet flow. Operation 412 may perform a header transformation for packet routing and/or switching. In operation 414, one or more levels of egress metering operations may be performed on the packet. Operation 414 may utilize one or more egress MCB 416, such as MCBs 302 and/or 306, as defined for the packet flow. Operation 414 may use pointers in the FCB to point to a transform control block (TCB), which may identify the particular MCB.

In operation 418, the packet may be sent to an appropriate interface for transmission out of the VRE in accordance with the transformed header in operation 412. Although procedure 400 includes an embodiment of the present invention that performs both of ingress metering and egress metering, nothing requires that both ingress and egress metering be performed.

In one embodiment, the ingress metering performed by operation 408 may utilize information from existing packet headers prior to header transformation in operation 412. The egress metering performed by operation 414 may utilize information from packet headers subsequent to header transformation in operation 412.

MCBs are shared data structures that may be utilized by one or more processing elements of a VRE. Unlike conventional metering, because packets may be metered at various times during packet processing, an MCB may be needed concurrently by more than one metering operation. To help preserve the integrity of MCBs, in one embodiment of the present invention, a cache locking operation is implemented to prevent the changes to a data structure, such as the MCBs. In this embodiment, when an MCB is used during a metering operation, a cache-lock bit may be set preventing another metering operation from updating or changing the MCB. Upon completion of the metering operation, the cache-lock bit may be reset. In one embodiment, the cache lock bit may be part of a cache tag store.

Figure 5:
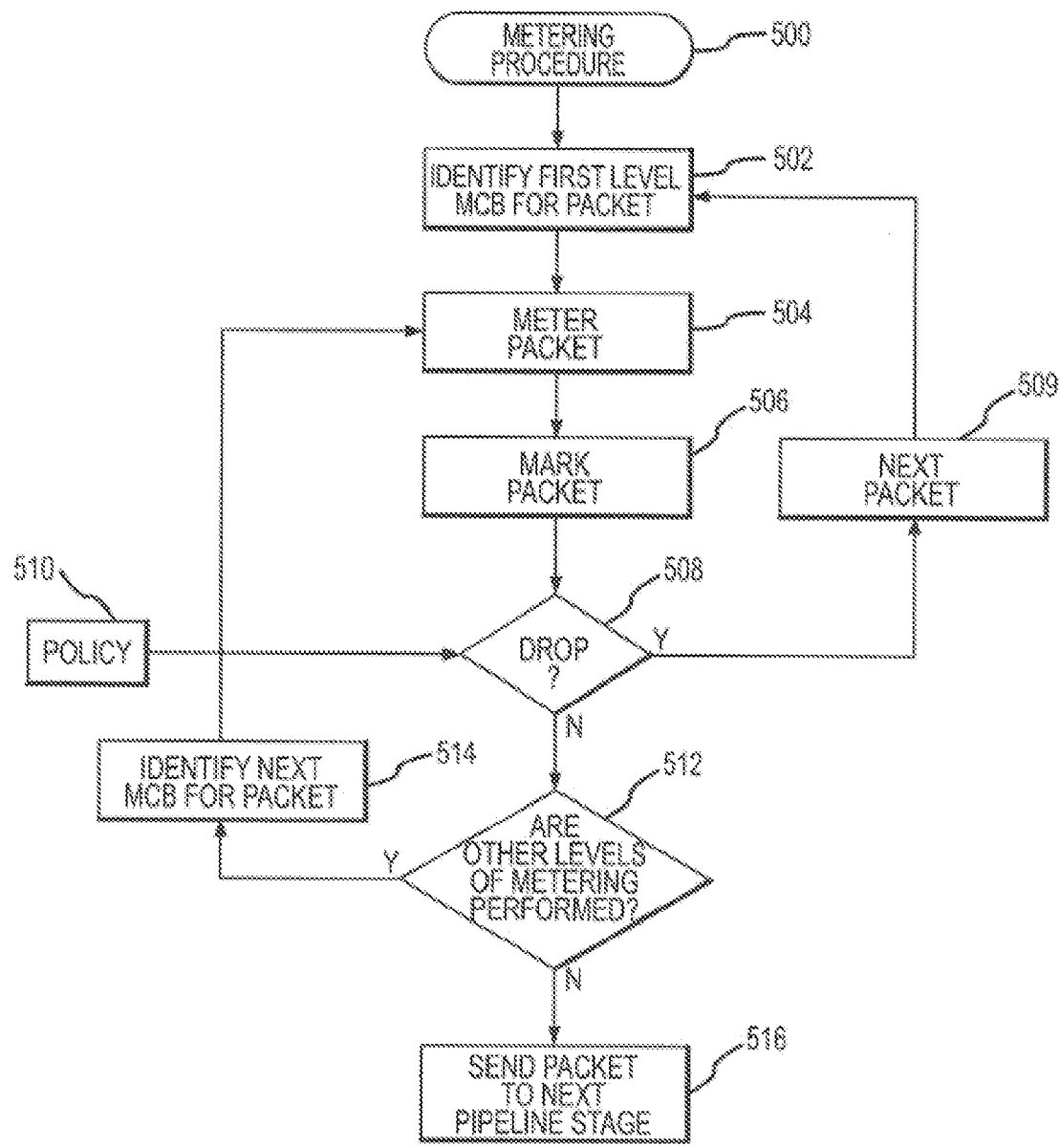
FIG. 5 is a flow chart of a metering procedure in accordance with an embodiment of the present invention.

FIG. 5 is a flow chart of a metering procedure in accordance with an embodiment of the present invention. Procedure 500 may be suitable for performing one or more various levels of ingress metering, such as the ingress metering performed in operation 408 (FIG. 4). Procedure 500 may also be suitable for performing one or more various levels of egress metering, such as the egress metering performed in operation 414 (FIG. 4). In accordance with procedure 500, for each level of metering, a packet of a particular packet flow may, for example, be metered, marked and dropped. Procedure 500 may serve as a rate limiting function for packets of various profiles. Packet processing procedure 500 may be performed by VRE 204 (FIG. 2) although other routing engines and devices may also be suitable for performing procedure 500. Procedure 500 may be performed as part of one or more operations of pipeline processing performed by the VRE's PFE. In one embodiment, metering may be performed for each level of a hierarchy of metering for packets of a particular flow. In one embodiment, procedure 500 may use a two-rate three color metering and marking scheme such as the trTCM scheme described in RFC 2698, however other metering and marking schemes are also suitable. Although the individual operations of procedure 500 are illustrated and described as separate operations, one or more of the individual operations may be performed concurrently and nothing requires that the operations be performed in the order illustrated.

In operation 502, an MCB for a first level MCB is identified for a packet flow. In the case of ingress metering, the MCB may be identified for packets from a particular virtual interface (VI). In operation 504, the packet is metered. In one embodiment, when token buckets are used, operation 504 may include incrementing a token count Tp by one PIR times per second up to PBS. Operation 504 may also include incrementing a token count Tc by one CIR times per second up to CBS. Token counts Tp and Tc may be initially full (i.e., set to PBS and CBS respectively). In response to arrival of a packet, the number of bytes in the packet may be subtracted from the token buckets to determine the color the packet.

In operation 506, the packet is marked to indicate the result of the metering in operation 506. In a color-blind mode, a packet may be marked as green if it does not exceed a CBS, yellow if it exceeds the CBS but not a PBS, and red if it exceeds both CBS and PBS. In a color-aware mode, the red packet may remain red, and a yellow packet may remain yellow or be marked as red, and a green packet may remain green, or be marked as yellow or red depend on the remaining tokens in the token bucket. In one embodiment, operation 506 may encode the packet's color into an RM field of the packets LQ header. The CIR, PIR, CBS, and PBS may be viewed as traffic parameters, which define a packet profile for a particular packet flow.

In operation 508, the packet may be dropped depending on policy 510 which may be operational for a specific packet flow or VI. For example, policy 510 may allow packets at lower levels to exceed packet profiles provided that a higher level profile has not been exceeded. In other words, packets colored as red may not necessarily be dropped and may go through a next level of metering. In one embodiment, RateInCtl and RateOutCtl fields of the TCB may dictate whether and how to drop packets on ingress and/or egress rate limiting.

When operation 508 drops the packet, operations 502 through 508 may be repeated by operation 509 for next packet, which may be a packet of a different packet flow or different VI and which may use a different combination of MCBs.

When operation 508 does not drop the packet, operation 512 determines if another level of metering is to be performed. If additional-metering is to be performed, operation 514 may identify a MCB for the next level of metering and the metering, marking and dropping of operations 504 through 508 may be performed on the packet using the MCB for the next level of metering. Accordingly, procedure 500 may implement a hierarchy of metering for any particular packet flow or VI. When operation 512 determines that no additional metering is required, operation 516 is performed. In operation 516, the packet may be sent to the next stage of pipeline processing in the VRE.

Thus, a method and system for metering in a virtual routing platform has been described. The method and system allows for metering of particular customers, communication devices, service providers, as well as metering for particular services, such as IPSec, ACL, etc.

The foregoing description of specific embodiments reveals the general nature of the invention sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the invention embraces all such alternatives, modifications, equivalents and variations as fall within the spirit and scope of the appended claims.

What is claimed is:

1. A method comprising:
   storing, within a shared memory system a routing platform, a plurality of metering contexts, each of the plurality of metering contexts containing information regarding a status and a state of one or more packet flows of a plurality of packet flows;
   applying, by a metering procedure operable within the routing platform, a first level of metering of a set of hierarchical levels of metering associated with a first packet flow of the plurality of packet flows to the first packet flow by comparing a packet rate of the first packet flow against a first set of traffic rate parameters established for the first packet flow and stored in a first metering context of the plurality of metering contexts;
   applying, by the metering procedure, a next level of metering of the set of hierarchical levels of metering associated with the first packet flow to the first packet flow and a second packet flow of the plurality of packet flows by comparing packet rates of both the first packet flow and the second packet flow against a second set of traffic rate parameters established for the first packet flow and the second packet flow and stored in a second metering context of the plurality of metering contexts;
   selectively dropping, by the routing platform, packets of the first packet flow when (i) the packet rate of the first packet flow exceeds a traffic rate parameter of the first set of traffic rate parameters, and (ii) the packet rates of the first packet flow and the second packet flow when combined together exceed a traffic rate parameter of the second set of traffic rate parameters; and
   refraining from dropping, by the routing platform, packets of the first packet flow when (i) the packet rate of the first packet flow exceeds the traffic rate parameter of the first set of traffic rate parameters, and (ii) the packet rates of the first packet flow and the second packet flow when combined together do not exceed the traffic rate parameter of the second set of rate parameters;
   whereby a metering policy of the routing platform may allow packets at lower levels of the set of hierarchical levels of metering to exceed a predefined packet profile provided that a higher-level packet profile has not been exceeded.

2. The method of claim 1, further comprising
   applying, by the metering procedure, a first level of metering of the set of hierarchical levels of metering associated with the second packet flow to the second packet flow by comparing a packet rate of the second packet flow against a third set of traffic rate parameters established for the second packet flow and stored in a third metering context of the plurality of metering contexts;
   applying, by the metering procedure, a next level of metering of the set of hierarchical levels of metering associated with the second packet flow to the first packet flow and the second packet flow by comparing packet rates of both the first packet flow and the second packet flow against the second set of traffic rate parameters;
   selectively dropping, by the routing platform, packets of the second packet flow when (i) the packet rate of the second packet flow exceeds a traffic rate parameter of the third set of traffic rate parameters, and (ii) the packet rates of the first packet flow and the second packet flow when combined together exceed the traffic rate parameter of the second set of traffic rate parameters; and
   refraining from dropping, by the routing platform, packets of the second packet flow when (i) the packet rate of the second packet flow exceeds the traffic rate parameter of the third set of traffic rate parameters, and (ii) the packet rates of the first packet flow and the second packet flow when combined together do not exceed the traffic rate parameter of the second set of rate parameters.

3. The method of claim 1, wherein the routing platform comprises a virtual routing platform in which a plurality of virtual router contexts are represented within the memory system, and wherein the first packet flow is associated with a first virtual router context of the plurality of virtual router contexts and the second packet flow is associated with a second virtual router context of the plurality of virtual router contexts.

4. The method of claim 1, wherein traffic rate parameters of the first set of traffic rate parameters and the second set of traffic rate parameters include at least one of either a peak information rate (PIR) parameter or a committed information rate (CIR) parameter established for the associated packet flow.

5. The method of claim 1, further comprising:
   identifying packets associated with the first packet flow and the second packet flow that support a service;
   applying, by the metering procedure, a third level of metering on packets identified as supporting the service, wherein the service comprises one or more of Internet Protocol (IP) security (IPSec) packets, access control list (ACL) packets, video packets, Voice over IP (VoIP) packets and multicast packets.

6. A method comprising:
   storing, within a shared memory system a routing platform, a plurality of metering contexts, each of the plurality of metering contexts containing information regarding a status and a state of one or more categories of packets of a plurality of categories of packets;
   applying, by a metering procedure operable within the routing platform, a first level of metering of a set of hierarchical levels of metering associated with a first category of packets of the plurality of categories of packets to the first category of packets by comparing a packet rate of the first category of packets against a first set of traffic rate parameters established for the first category of packets and stored in a first metering context of the plurality of metering contexts;

applying, by the metering procedure, a next level of metering of the set of hierarchical levels of metering associated with the first category of packets to the first category of packets and a second category of packets of the plurality of categories of packets by comparing packet rates of both the first category of packets and the second category of packets against a second set of traffic rate parameters established for the first category of packets and the second category of packets and stored in a second metering context of the plurality of metering contexts;

selectively dropping, by the routing platform, packets of the first category of packets when (i) the packet rate of the first category of packets exceeds a traffic rate parameter of the first set of traffic rate parameters, and (ii) the packet rates of the first category of packets and the second category of packets when combined together exceed a traffic rate parameter of the second set of traffic rate parameters; and refraining from dropping, by the routing platform, packets of the first category of packets when (i) the packet rate of the first category of packets exceeds the traffic rate parameter of the first set of traffic rate parameters, and (ii) the packet rates of the first category of packets and the second category of packets when combined together do not exceed the traffic rate parameter of the second set of rate parameters;

whereby a metering policy of the routing platform may allow packets at lower levels of the set of hierarchical levels of metering to exceed a predefined packet profile provided that a higher-level packet profile has not been exceeded.

7. The method of claim 6, further comprising:

applying, by the metering procedure, a first level of metering of the set of hierarchical levels of metering associated with the second category of packets to the second category of packets by comparing a packet rate of the second category of packets against a third set of traffic rate parameters established for the second category of packets and stored in a third metering context of the plurality of metering contexts;

applying, by the metering procedure, a next level of metering of the set of hierarchical levels of metering associated with the second category of packets to the first category of packets and the second category of packets by comparing packet rates of both the first category of packets and the second category of packets against the second set of traffic rate parameters;

selectively dropping, by the routing platform, packets of the second category of packets when (i) the packet rate of the second category of packets exceeds a traffic rate parameter of the third set of traffic rate parameters, and (ii) the packet rates of the first category of packets and the second category of packets when combined together exceed the traffic rate parameter of the second set of traffic rate parameters; and refraining from dropping, by the routing platform, packets of the second category of packets when (i) the packet rate of the second category of packets exceeds the traffic rate parameter of the third set of traffic rate parameters, and (ii) the packet rates of the first category of packets and the second category of packets when combined together do not exceed the traffic rate parameter of the second set of rate parameters.

8. The method of claim 6, wherein the first category of packets comprises packets associated with a first packet flow, packets associated with a first group of packet flows, packets originated by or destined for a first communication device, packets originated by or destined for a first group of communication devices, packets associated with a first service or packets associated with a first group of services.

9. The method of claim 8, wherein the second category of packets comprises packets associated with a second packet flow, packets associated with a second group of packet flows, packets originated by or destined for a second communication device, packets originated by or destined for a second group of communication devices, packets associated with a second service or packets associated with a second group of services.

10. The method of claim 9, wherein the routing platform comprises a virtual routing platform in which a plurality of virtual router contexts are represented within the memory system, and wherein the first category of packets is associated with a first virtual router context of the plurality of virtual router contexts and the second category of packets is associated with a second virtual router context of the plurality of virtual router contexts.

11. The method of claim 7, wherein traffic rate parameters of the first set of traffic rate parameters and the second set of traffic rate parameters include at least one of either a peak information rate (PIR) parameter or a committed information rate (CIR) parameter established for the associated category of packets.

12. The method of claim 7, wherein the first category of packets comprises a first packet flow and the second category of packets comprises a second packet flow and wherein the method further comprises:

identifying packets associated with the first packet flow and the second packet flow that support a service; and applying, by the metering procedure, a third level of metering on packets identified as supporting the service, wherein the service comprises one or more of Internet Protocol (IP) security (IPSec) packets, access control list (ACL) packets, video packets, Voice over IP (VoIP) packets and multicast packets.

13. A non-transitory computer-readable storage medium tangibly embodying a set of instructions, which when executed by one or more processors of a routing platform, cause the one or more processors to perform a method for applying hierarchically metering to categories of packets, the method comprising:

storing, within a shared memory system the routing platform, a plurality of metering contexts, each of the plurality of metering contexts containing information regarding a status and a state of one or more categories of packets of a plurality of categories of packets;

applying a first level of metering of a set of hierarchical levels of metering associated with a first category of packets of the plurality of categories of packets to the first category of packets by comparing a packet rate of the first category of packets against a first set of traffic rate parameters established for the first category of packets and stored in a first metering context of the plurality of metering contexts;

applying a next level of metering of the set of hierarchical levels of metering associated with the first category of packets to the first category of packets and a second category of packets of the plurality of categories of packets by comparing packet rates of both the first category of packets and the second category of packets against a second set of traffic rate parameters established for the first category of packets and the second category of packets and stored in a second metering context of the plurality of metering contexts;

selectively dropping packets of the first category of packets when (i) the packet rate of the first category of packets exceeds a traffic rate parameter of the first set of traffic rate parameters, and (ii) the packet rates of the first category of packets and the second category of packets when combined together exceed a traffic rate parameter of the second set of traffic rate parameters; and refraining from dropping packets of the first category of packets when (i) the packet rate of the first category of packets exceeds the traffic rate parameter of the first set of traffic rate parameters, and (ii) the packet rates of the first category of packets and the second category of packets when combined together do not exceed the traffic rate parameter of the second set of rate parameters.

14. The computer-readable medium of claim 13, wherein the method further comprises:

applying, by the metering procedure, a first level of metering of the set of hierarchical levels of metering associated with the second category of packets to the second category of packets by comparing a packet rate of the second category of packets against a third set of traffic rate parameters established for the second category of packets and stored in a third metering context of the plurality of metering contexts;

applying, by the metering procedure, a next level of metering of the set of hierarchical levels of metering associated with the second category of packets to the first category of packets and the second category of packets by comparing packet rates of both the first category of packets and the second category of packets against the second set of traffic rate parameters;

selectively dropping, by the routing platform, packets of the second category of packets when (i) the packet rate of the second category of packets exceeds a traffic rate parameter of the third set of traffic rate parameters, and (ii) the packet rates of the first category of packets and the second category of packets when combined together exceed the traffic rate parameter of the second set of traffic rate parameters; and refraining from dropping, by the routing platform, packets of the second category of packets when (i) the packet rate of the second category of packets exceeds the traffic rate parameter of the third set of traffic rate parameters, and (ii) the packet rates of the first category of packets and the second category of packets when combined together do not exceed the traffic rate parameter of the second set of rate parameters.

15. The computer-readable medium of claim 13, wherein the first category of packets comprises packets associated with a first packet flow, packets associated with a first group of packet flows, packets originated by or destined for a first communication device, packets originated by or destined for a first group of communication devices, packets associated with a first service or packets associated with a first group of services.

16. The computer-readable medium of claim 15, wherein the second category of packets comprises packets associated with a second packet flow, packets associated with a second group of packet flows, packets originated by or destined for a second communication device, packets originated by or destined for a second group of communication devices, packets associated with a second service or packets associated with a second group of services.

17. The computer-readable medium of claim 16, wherein the routing platform comprises a virtual routing platform in which a plurality of virtual router contexts are represented within the memory system, and wherein the first category of packets is associated with a first virtual router context of the plurality of virtual router contexts and the second category of packets is associated with a second virtual router context of the plurality of virtual router contexts.

18. The computer-readable medium of claim 14, wherein traffic rate parameters of the first set of traffic rate parameters and the second set of traffic rate parameters include at least one of either a peak information rate (PIR) parameter or a committed information rate (CIR) parameter established for the associated category of packets.

19. The computer-readable medium of claim 14, wherein the first category of packets comprises a first packet flow and the second category of packets comprises a second packet flow and wherein the method further comprises:

identifying packets associated with the first packet flow and the second packet flow that support a service; and applying, by the metering procedure, a third level of metering on packets identified as supporting the service, wherein the service comprises one or more of Internet Protocol (IP) security (IPSec) packets, access control list (ACL) packets, video packets, Voice over IP (VoIP) packets and multicast packets.

* * * * *